United States Patent
Lin

(10) Patent No.: US 8,042,492 B2
(45) Date of Patent: *Oct. 25, 2011

(54) PET GROOMING COMB CAPABLE OF ADJUSTING COMBING ANGLE

(75) Inventor: Ralph Lin, Taipei (TW)

(73) Assignee: Han Lien International Corp., Taipei (TW)

(*) Notice: Subject to any disclaimer, the term of this patent is extended or adjusted under 35 U.S.C. 154(b) by 380 days.

This patent is subject to a terminal disclaimer.

(21) Appl. No.: 12/236,407

(22) Filed: Sep. 23, 2008

(65) Prior Publication Data

US 2009/0272331 A1 Nov. 5, 2009

(30) Foreign Application Priority Data

May 1, 2008 (TW) ................. 97116087 A

(51) Int. Cl.
*A01K 13/00* (2006.01)
*A45D 24/04* (2006.01)

(52) U.S. Cl. ............ 119/633; 119/625; 132/150

(58) Field of Classification Search ........... 119/633, 119/625; 132/219, 112, 121, 150, 155, 143, 132/148, 152, 265
See application file for complete search history.

(56) References Cited

U.S. PATENT DOCUMENTS

| | | | | |
|---|---|---|---|---|
| 2,160,618 A * | 5/1939 | Kreutzig | ...... | 132/120 |
| 2,610,638 A * | 9/1952 | Franklin | ...... | 132/119 |
| 2,803,256 A * | 8/1957 | Lerner | ...... | 132/123 |
| 3,354,890 A * | 11/1967 | Collison | ...... | 132/136 |
| 4,570,651 A * | 2/1986 | Adams | ...... | 132/212 |
| 4,605,023 A * | 8/1986 | Modin | ...... | 15/145 |
| 5,067,444 A * | 11/1991 | Parker | ...... | 119/606 |
| 5,337,764 A * | 8/1994 | McKay | ...... | 132/116 |
| 5,343,880 A * | 9/1994 | McKay | ...... | 132/116 |
| 5,479,951 A * | 1/1996 | Denebeim | ...... | 132/265 |
| 5,992,423 A * | 11/1999 | Tevolini | ...... | 132/200 |
| 6,070,597 A * | 6/2000 | Motherhead | ...... | 132/262 |
| 6,145,513 A * | 11/2000 | Chu et al. | ...... | 132/112 |
| 6,230,716 B1 * | 5/2001 | Minoletti | ...... | 132/226 |
| 6,691,712 B2 * | 2/2004 | Chu et al. | ...... | 132/112 |
| 6,789,549 B2 * | 9/2004 | Johnson | ...... | 132/120 |
| 7,044,137 B2 * | 5/2006 | Glucksman et al. | ...... | 132/114 |
| 7,356,869 B2 * | 4/2008 | Knopow et al. | ...... | 15/210.1 |
| 7,784,141 B2 * | 8/2010 | Knopow et al. | ...... | 15/210.1 |
| 2004/0035435 A1 * | 2/2004 | Glucksman et al. | ...... | 132/114 |
| 2010/0236571 A1 * | 9/2010 | Haziza | ...... | 132/210 |

* cited by examiner

*Primary Examiner* — Yvonne R. Abbott
(74) *Attorney, Agent, or Firm* — Browdy and Neimark, PLLC

(57) ABSTRACT

A pet grooming comb includes a grip having a plurality of first coupling portions circularly arranged around a longitudinal axis thereof and a comb head having a plurality of teeth and a second coupling portion selectively coupled to one of the first coupling portions. Thus, a user can adjust a setting angle of the comb head relative to the grip by means of the engagement of one of the first coupling portions of the grip with the second coupling portion of the comb head, thereby enhancing convenience of use.

15 Claims, 7 Drawing Sheets

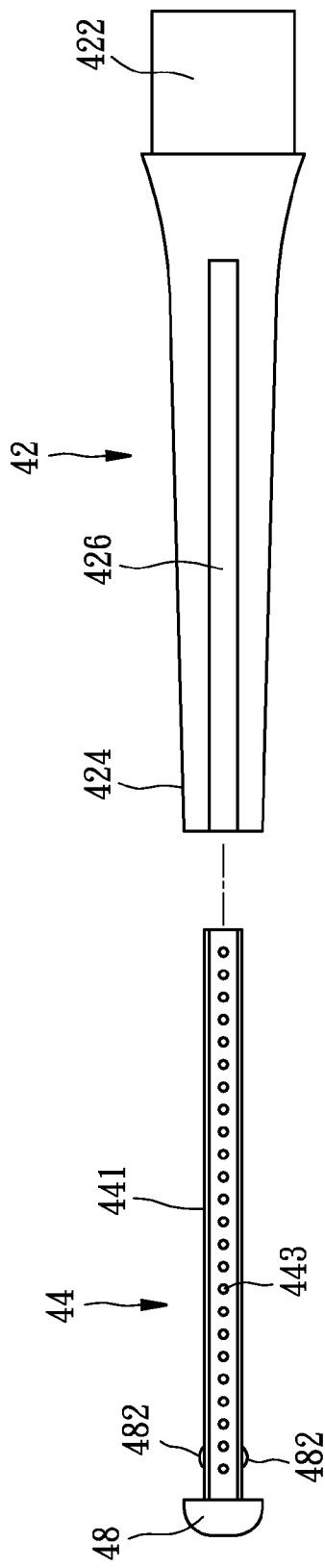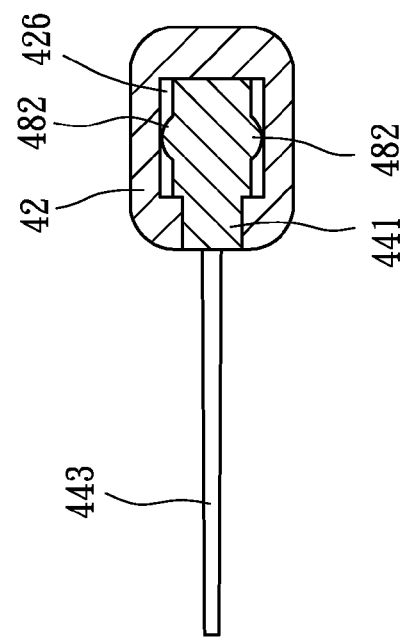
FIG. 7
FIG. 8

PET GROOMING COMB CAPABLE OF ADJUSTING COMBING ANGLE

BACKGROUND OF THE INVENTION

1. Field of the Invention

The present invention relates generally to pet supplies, and more specifically to a pet grooming comb that can allow adjustment of the combing angle conveniently.

2. Description of the Related Art

A conventional pet grooming comb generally includes a grip, a comb head fixed to the grip, and a plurality of teeth fixed to the comb head such that a user can hold the grip to force the teeth to comb a pet's hair.

Since the comb head is fixed to the grip and unrotatable, the teeth that are fixed to the comb head face a fixed direction. However, a pet has different characteristics of hair at different positions, and therefore a user needs to adjust a holding angle of the pet grooming comb or change a way of holding the grip to enable the teeth to approach the pet's skin for combing the pet's hair. Thus, it can be seen that the conventional pet grooming comb has the drawback of requiring strenuous efforts to operate, resulting in inconvenience of use.

SUMMARY OF THE INVENTION

The present invention has been accomplished in view of the above-noted circumstances. It is one objective of the present invention to provide a pet grooming comb, which can adjust its combing angle for a user's operation To achieve this objective of the present invention, the pet grooming comb comprises a grip and a comb head. The grip has a plurality of first coupling portions circularly arranged around a longitudinal axis thereof. The comb head has a plurality of teeth and a second coupling portion selectively coupled to one of the first coupling portions.

Accordingly, a user can adjust a setting angle of the comb head relative to the grip by means of the engagement of one of the first coupling portions of the grip with the second coupling portion of the comb head for enabling the user to choose a laborsaving angle to operate the pet grooming comb, thereby enhancing the convenience of use.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein:

FIG. 7 is an exploded bottom view of the comb bar and the comb plate of the pet grooming comb according to the preferred embodiment of the present invention;

FIG. 8 is an assembled sectional view of the comb bar and the comb plate of the pet grooming comb according to the preferred embodiment of the present invention;

DETAILED DESCRIPTION OF THE INVENTION

Figure 1:
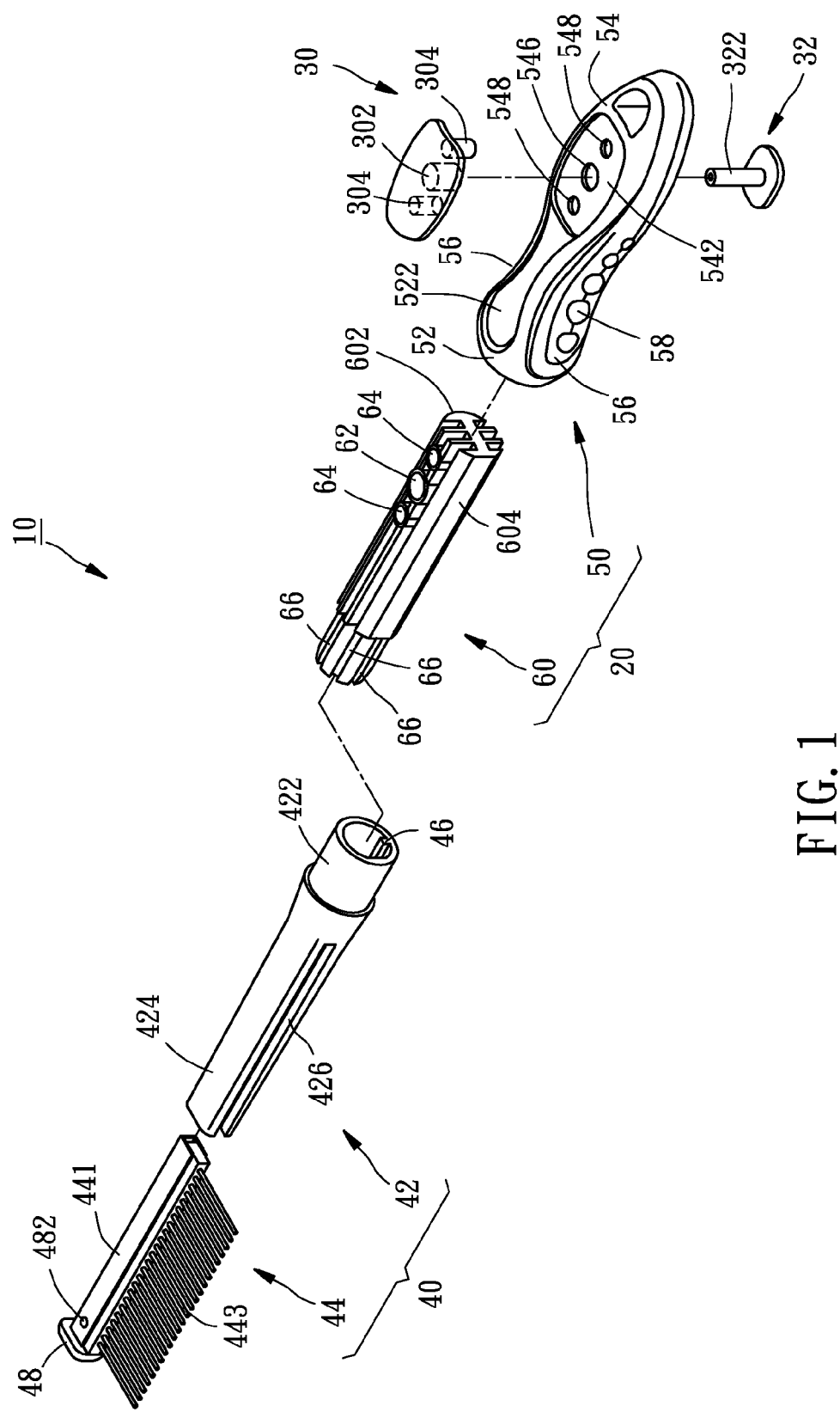
FIG. 1 is an exploded view of a pet grooming comb according to a preferred embodiment of the present invention.
Figure 2:
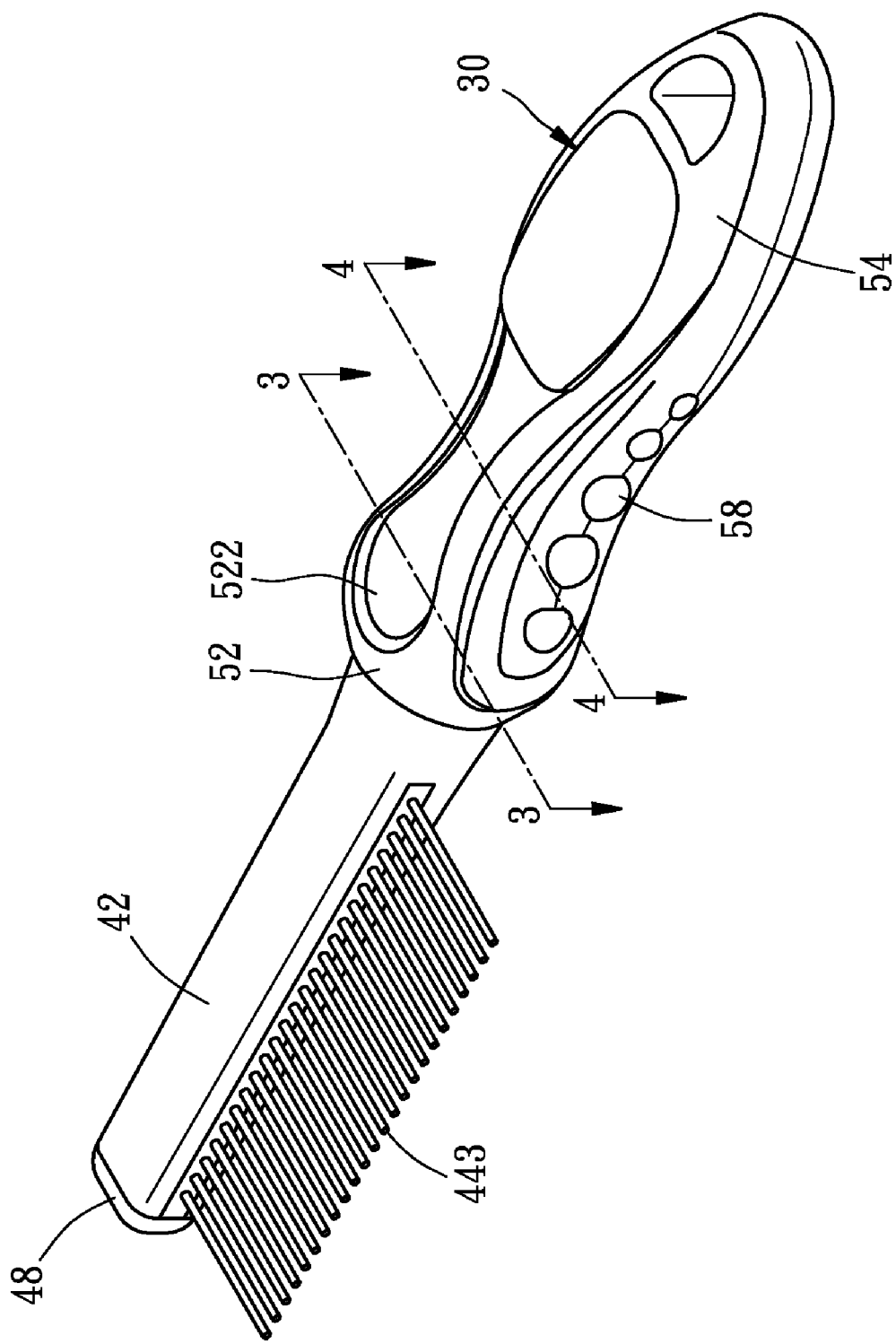
FIG. 2 is a perspective view of the pet grooming comb according to the preferred embodiment of the present invention.

As shown in FIGS. 1 and 2, a pet grooming comb 10 in accordance with a preferred embodiment of the present invention comprises a grip 20, two decorative boards 30 and 32, and a comb head 40.

Figure 4:
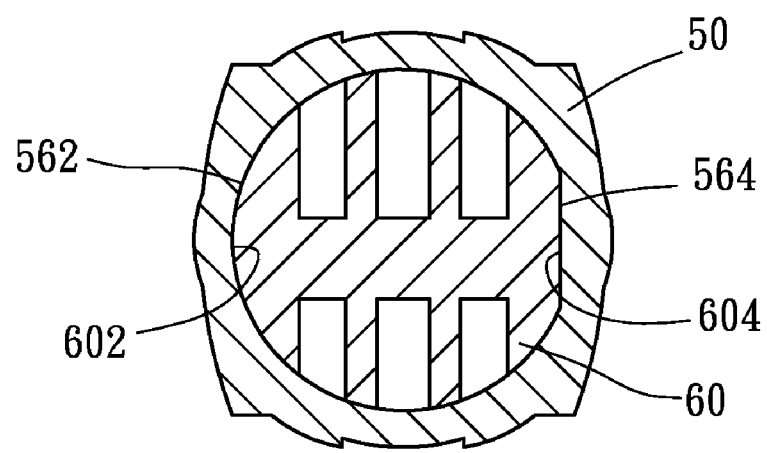
FIG. 4 is a sectional view taken along line 4-4 of FIG. 2.

The grip 20 has a housing 50 and a shaft 60. The housing 50 has a head portion 52, a body portion 54, a first concavity 522 at each of top and bottom sides of the head portion 52 for accommodation of a user's thumb or forefinger, a second concavity 542 at a top side of the body portion 54, and a third concavity 544 at a bottom side of the body portion 54. The housing 50 has an inner cambered surface 562 at an inner periphery thereof, and an inner plane 564 opposite to the inner cambered surface 562, as shown in FIG. 4. Further, the body portion 54 has a first outer through hole 546 penetrating through top and bottom sides of the body portion 54 in communication with the second concavity 542 and the third concavity 544 and the shaft hole, and two second outer through holes 548 penetrating through the top side of the body portion 54 in communication with the second concavity 542 and the shaft hole and located at places corresponding to two opposite sides of the first outer through hole 546. In addition, a junction of the head portion 52 and the body portion 54 is inwardly shrunken to form two opposite inwardly curved surfaces 56, and a plurality of anti-slip blocks 58 are spacedly provided at each of the curved surfaces 56 and arranged in a straight manner from the head portion 52 to the body portion 54 for providing a skidproof effect.

The shaft 60 has an outer cambered surface 602, an outer plane 604 opposite to the outer cambered surface 602, an inner through hole 62 penetrating through top and bottom sides thereof, and two mounting holes 64 recessed from the top side thereof. The shaft 60 is inserted into the housing 50 in such a manner that the inner through hole 62 and the mounting holes 64 are respectively aligned with the first outer through hole 546 and the second outer through holes 548, and the outer cambered surface 602 and the outer plane 604 are respectively abutted against the inner cambered surface 562 and the inner plane 564, resulting in that the shaft 60 is not rotatable relative to the housing 50 randomly. Further, the shaft 60 has eight first coupling portions 66, which are recesses in this embodiment, equiangularly, spacedly and circularly arranged at a periphery thereof around a longitudinal axis of the shaft 60.

Figure 5:
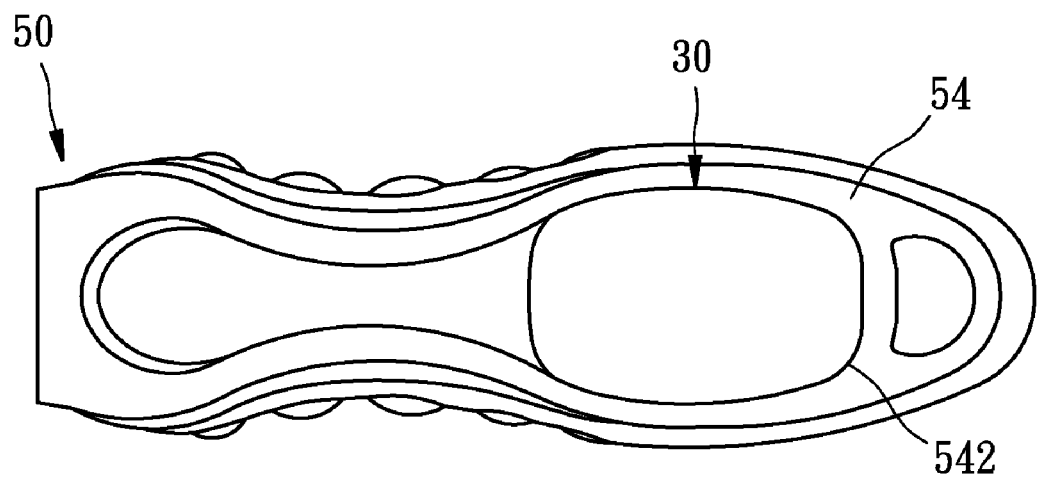
FIG. 5 is a top view of the grip of the pet grooming comb according to the preferred embodiment of the present invention.
Figure 6:
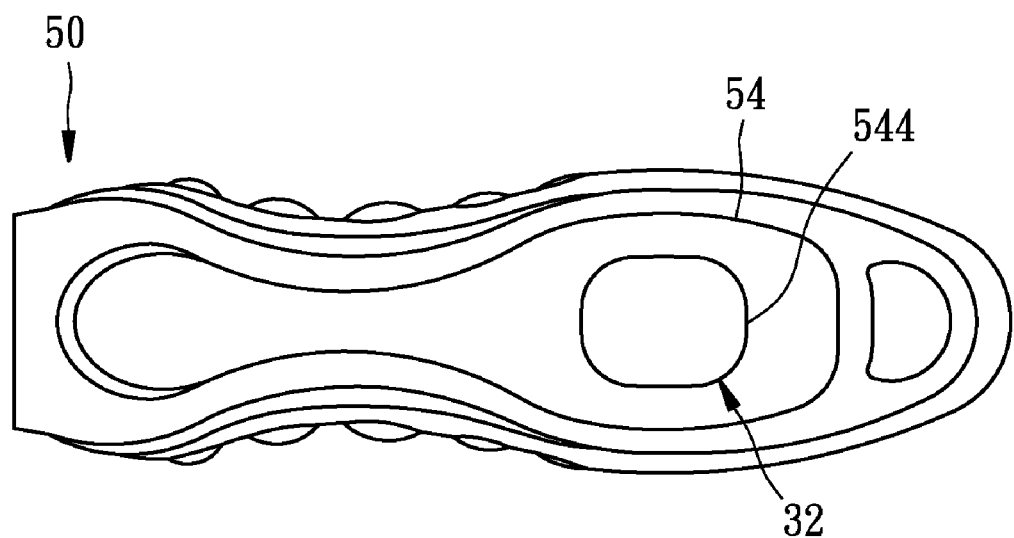
FIG. 6 is a bottom view of the grip of the pet grooming comb according to the preferred embodiment of the present invention.

The decorative board 30 has a first post 302 inserted in the first outer through hole 546 of the housing 50 and the inner through hole 62 of the shaft 60, and two second posts 304 respectively inserted in the second outer through holes 548 of the housing 50, and the mounting holes 64 of the shaft 60 such that the decorative board 30 is accommodated in the second concavity 542, as shown in FIGS. 2 and 5. The decorative board 32 has a third post 322 inserted in the first post 302 of the decorative board 30 through the first outer through hole 546 and the inner through hole 62 such that the decorative board 32 is accommodated in the third concavity 544, as shown in FIG. 6. As a result, the shaft 60 can not move along an axial direction of the housing 50 due to the engagement of the decorative boards 30 and 32, and patterns or trademarks can be designed on the decorative boards 30 and 32 according to the user's need.

Figure 3:
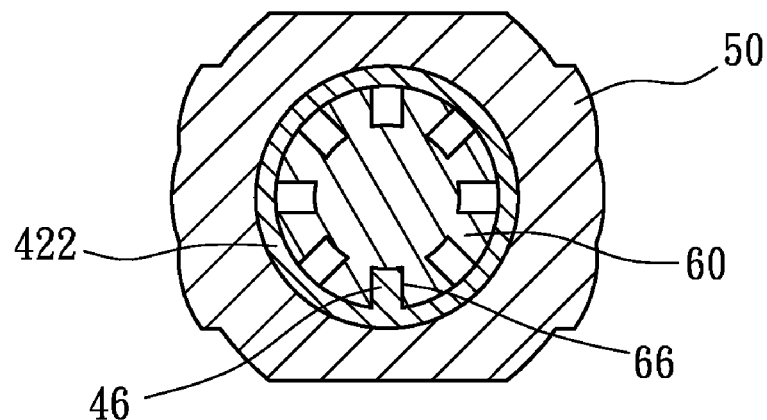
FIG. 3 is a sectional view taken along line 3-3 of FIG. 2.
Figure 10:
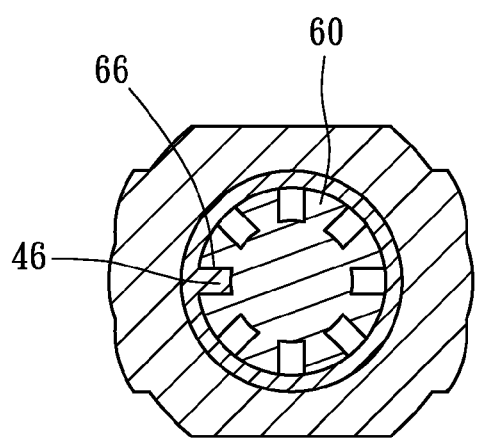
FIG. 10 is a sectional view taken along line 10-10 of FIG. 9.

As shown in FIGS. 7 and 8, the comb head 40 has a comb bar 42 and a comb plate 44. The comb bar 42 has a first end 422 of a tubular form provided at an inner periphery thereof with a second coupling portion 46, which is a protrusion in this embodiment and selectively insertable into one of the first coupling portions 66, i.e., recesses, of the shaft 60 such that the comb bar 42 can be set to one of eight angles relative to the grip 20, as shown in FIGS. 3 and 10, a second end 424, and an insertion groove 426 extending from the second end 424 toward the first end 422. The comb plate 44 has a base portion 441, a block 48 at a distal end of the base portion 441, two dots 482 respectively provided at two opposite sides of the base portion 441 and adjacent to the block 48, and a plurality of teeth 443 rotatably mounted on the base portion 441. The comb plate 44 is fitted to the comb bar 42 in such a way that the base portion 441 is inserted into the insertion groove 426 until the block 48 is abutted against the second end 424 of the comb bar 42, and the dots 482 are stopped against a periphery of the insertion groove 426.

Figure 9:
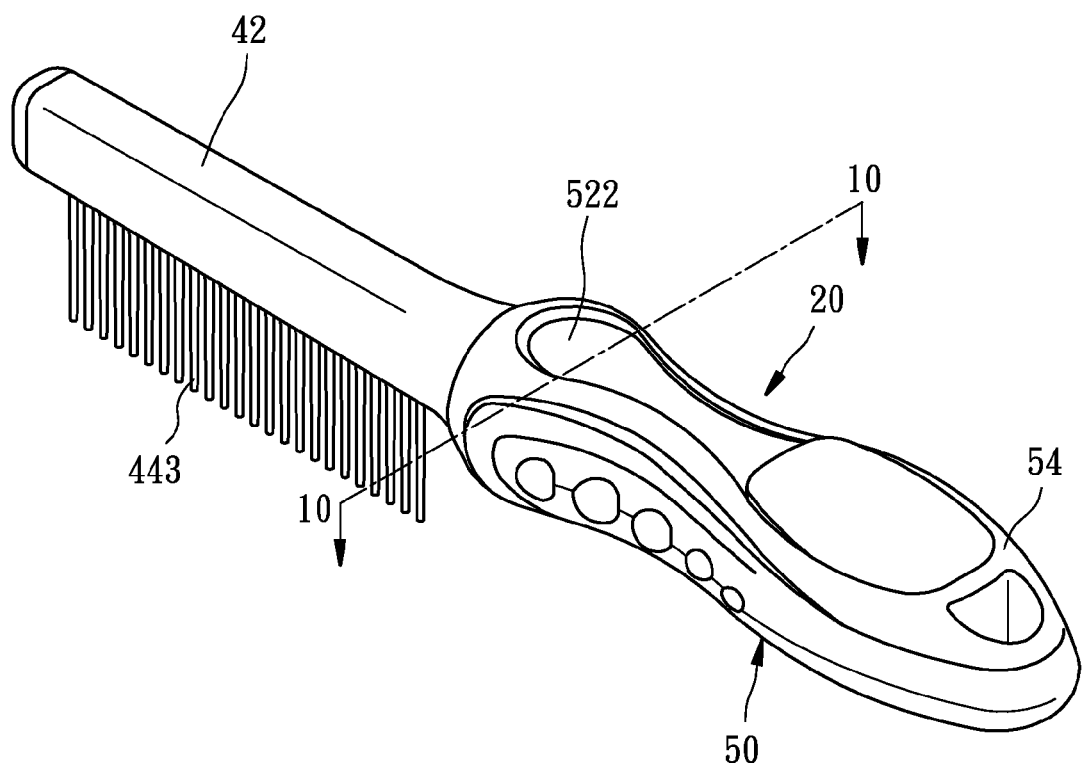
FIG. 9 is a perspective view of the pet grooming comb according to the preferred embodiment of the present invention, showing the comb head is rotated by 90 degrees compared with the pet grooming comb shown in FIG. 2.

By the aforesaid design, when the user would like to adjust the angle of the comb head 40 relative to the grip 20, the user can draw the comb bar 42 away from the shaft 60 of the grip 20 to make the second coupling portion 46, i.e. protrusion, leave away from one of the first coupling portions 66, i.e. recesses, and then reinsert the second coupling portion 46, i.e. protrusion, of the comb bar 42 into another first coupling portion 66, i.e. recess, of the shaft 60 of the grip 20 according to the user's need, as shown in FIGS. 9 and 10. As a result, the comb head 40 is rotatable and fixable to a specific angle relative to the grip 20 to enable the user to comb the pet's hair effortlessly. Further, when holding the grip 20, the user can hold the body portion 54 of the housing 50 to exert a force or place a thumb or forefinger on either of the concavities 522 of the top and bottom sides of the head portion 52 of the housing 50 for enabling the user to operate the grip 20 more comfortably and effortlessly due to its ergonomic design.

Figure 11:
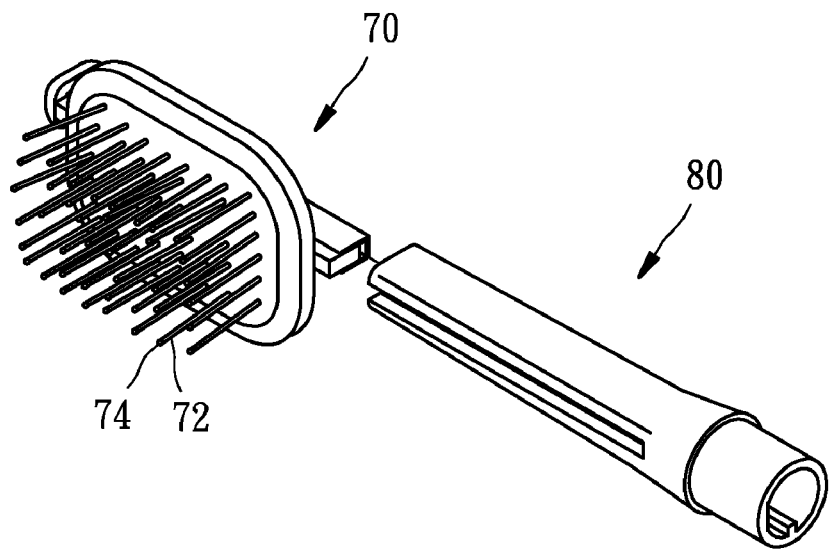
FIG. 11 is an exploded view of the comb head of the pet grooming comb according to the preferred embodiment of the present invention, showing a comb plate that has different type of teeth is provided.
Figure 12:
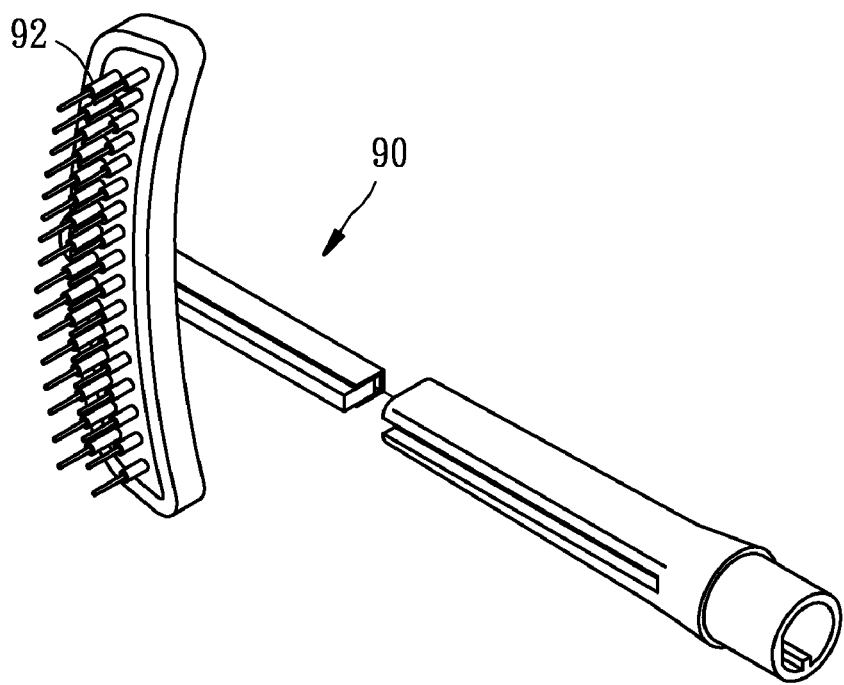
FIG. 12 is similar to FIG. 11, but showing another comb plate that has different type of teeth is provided.

In addition, because of the 360-degree rotatable teeth 443, the pet's hair won't be knotted; moreover, when the user would like to change different type of teeth 443, the user can draw the base portion 441 of the comb plate 44 away from the insertion groove 426 of the comb bar 42 to detach the comb plate 44 from the comb bar 42, and then insert a new comb plate, such as the comb plate denoted by reference numeral 70 in FIG. 11, that has different kind of teeth into the insertion groove 426 of the comb bar 42. As shown in FIG. 11, the teeth 72 of the comb plate 70 each have a sphere 74 at a distal end thereof to increase the contact area between each one of the teeth 72 and the pet's hair. FIG. 12 shows another comb plate 90 that has double rows of tapered teeth 92 to prevent the pet's hair from knotting.

Certainly, the pet grooming comb of the present invention can be made with various kinds of design on the basis of the spirit of the present invention. For example, the first concavity is not necessary to be formed on each of the top and bottom sides of the head portion. It can be formed on either of the top and bottom sides of the head portion. Further, the body portion of the housing and the shaft can be respectively provided with one or more second outer through holes and mounting holes, or even the arrangement of the second outer through holes and the mounting holes can be eliminated. Besides, the first coupling portions of the grip and the second coupling portion of the comb head can be exchanged but not limited to the above-mentioned embodiment. In other words, the first coupling portions can be designed to be provided at the comb bar of the comb head, and the second coupling portion can be designed to be provided at the shaft of the grip. Further, the shaft can be eliminated if the recesses are directly formed on the periphery of the shaft hole of the housing.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pet grooming comb comprising:
   a grip having a plurality of first coupling portions circularly arranged around a longitudinal axis thereof; and
   a comb head having a plurality of teeth and a second coupling portion selectively coupled to one of the first coupling portions of the grip;
   wherein each of said first coupling portions of said grip is a recess, and said second coupling portion of said comb head is a protrusion, the first coupling portions of said grip having a constant dimension.

2. The pet grooming comb as claimed in claim 1, wherein said grip has a housing and a shaft inserted in said housing and provided with said first coupling portions.

3. The pet grooming comb as claimed in claim 2, wherein an inner periphery of said housing of said grip has an inner cambered surface and an inner plane opposite to said inner cambered surface, and an outer periphery of said shaft has an outer cambered surface abutted against said inner cambered surface and an outer plane opposite to said outer cambered surface and abutted against said inner plane.

4. The pet grooming comb as claimed in claim 2, wherein said housing of said grip has a head portion, a body portion, a concavity at either of top and bottom sides of said head portion, and two opposite curved surfaces at a junction of said head portion and said body portion.

5. The pet grooming comb as claimed in claim 4, further comprising a plurality of anti-slip blocks spacedly provided at each of said curved surfaces and arranged in a straight manner from said head portion to said body portion.

6. The pet grooming comb as claimed in claim 4, further comprising two decorative boards, wherein said body portion is provided at each of top and bottom sides with a concavity for accommodation of the decorative boards.

7. The pet grooming comb as claimed in claim 6, wherein said body portion of said housing has an outer through hole penetrating through said top and bottom sides thereof and communicating with said concavities of said top and bottom sides thereof, and said shaft has an inner through hole aligned with said outer through hole, and said decorative boards each have a post inserted in said outer and inner through holes, wherein said post of one of said decorative boards is inserted in said post of the other of said decorative boards.

8. The pet grooming comb as claimed in claim 6, wherein said body portion of said housing has a first outer through hole penetrating through top and bottom sides thereof and communicating with said concavities of said top and bottom sides thereof, and a second outer through hole penetrating through one of said top and bottom sides of the body portion to communicate with one of said concavities of said top and bottom sides of the body portion; said shaft having an inner through hole aligned with said first outer through hole and a mounting hole aligned with said second outer through hole; one of said decorative boards has a first post inserted in said first outer through hole and said inner through hole and a second post inserted in said second outer through hole and said mounting hole, and the other of said decorative boards has a third post inserted in said first post through said first outer through hole and said inner through hole.

9. The pet grooming comb as claimed in claim 8, wherein said body portion of said housing has two said outer second through holes, and said shaft has two said mounting holes, and one of said decorative boards has two said second posts respectively inserted in said second outer through holes and said mounting holes.

10. The pet grooming comb as claimed in claim 2, wherein the first coupling portions of the shaft are equiangularly, spacedly and circularly arranged at a periphery thereof around a longitudinal axis of the shaft.

11. The pet grooming comb as claimed in claim 1, wherein said comb head has a comb bar provided with said second coupling portion, and a comb plate provided with a base portion detachably mounted to said comb bar and said teeth mounted to said base portion.

12. The pet grooming comb as claimed in claim 11, wherein said comb bar of said comb head has an insertion groove for insertion of said base portion of said comb plate.

13. The pet grooming comb as claimed in claim 12, wherein said base portion of said comb plate has two dots abutted against a periphery of said insertion groove of said comb bar.

14. The pet grooming comb as claimed in claim 11, wherein said comb bar has a first end provided with said second coupling portion and a second end abutted against a block of a distal end of said base portion of said comb plate.

15. The pet grooming comb as claimed in claim 1, wherein the first coupling portions of the shaft are equiangularly, spacedly and circularly arranged at a periphery thereof around a longitudinal axis of the shaft.

* * * * *